(12) United States Patent
Huett et al.

(10) Patent No.: US 11,945,339 B2
(45) Date of Patent: Apr. 2, 2024

(54) ENERGY MANAGEMENT SYSTEM FOR A TOWED VEHICLE

(71) Applicant: DA ROUGE PTY LTD ATF DA ROUGE UNIT TRUST, Campbellfield (AU)

(72) Inventors: Andrew Huett, Campbellfield (AU); Senoll Kaptan, Campbellfield (AU)

( * ) Notice: Subject to any disclaimer, the term of this patent is extended or adjusted under 35 U.S.C. 154(b) by 614 days.

(21) Appl. No.: 16/649,700

(22) PCT Filed: Sep. 24, 2018

(86) PCT No.: PCT/AU2018/000183
§ 371 (c)(1),
(2) Date: Mar. 23, 2020

(87) PCT Pub. No.: WO2019/056046
PCT Pub. Date: Mar. 28, 2019

(65) Prior Publication Data
US 2020/0254883 A1 Aug. 13, 2020

(30) Foreign Application Priority Data
Sep. 22, 2017 (AU) .................. 2017903872

(51) Int. Cl.
| | |
|---|---|
| *B60K 1/04* | (2019.01) |
| *B60K 1/02* | (2006.01) |
| *B60L 7/10* | (2006.01) |
| *B62D 59/04* | (2006.01) |
| *G05D 1/00* | (2006.01) |
| *B60W 60/00* | (2020.01) |

(52) U.S. Cl.
CPC .................. *B60L 7/10* (2013.01); *B60K 1/02* (2013.01); *B60K 1/04* (2013.01); *B62D 59/04* (2013.01); *G05D 1/0011* (2013.01); *G05D 1/0212* (2013.01); *B60K 2001/0444* (2013.01); *B60L 2200/28* (2013.01); *B60W 60/0023* (2020.02)

(58) Field of Classification Search
CPC .... B60L 7/10; B60L 2200/28; B60L 15/2045; B60K 1/02; B60K 1/04; B60K 2001/0444; G05D 1/0011; G05D 1/0212; B62D 59/04; B60W 60/0023
See application file for complete search history.

(56) References Cited

U.S. PATENT DOCUMENTS

| | | | |
|---|---|---|---|
| 8,365,849 B2 * | 2/2013 | Bartel | ....... B60L 7/10 303/146 |
| 10,500,975 B1 * | 12/2019 | Healy | ....... B60L 15/2027 |
| 2007/0008092 A1 * | 1/2007 | Deasy | ....... G01S 7/4972 340/436 |

(Continued)

FOREIGN PATENT DOCUMENTS

| | | |
|---|---|---|
| CA | 3015011 A1 | 8/2017 |
| DE | 10 2010 042 907 A1 | 4/2012 |

*Primary Examiner* — Jason D Shanske
*Assistant Examiner* — James J Triggs
(74) *Attorney, Agent, or Firm* — Edwin D. Schindler

(57) ABSTRACT

An energy management system for a towed vehicle includes an energy harvesting system for harvesting electrical energy from the energy of the towed vehicle, an energy storage system for storing the harvested electrical energy, and a computer controller for controlling the release of the stored electrical energy to one or more components of the towed vehicle for operating the towed vehicle.

19 Claims, 4 Drawing Sheets

(56) References Cited

U.S. PATENT DOCUMENTS

2011/0162896 A1* 7/2011 Gillett .................. B60N 2/14
                                                    180/2.2
2016/0318406 A1   11/2016 Healy
2018/0086227 A1*  3/2018 Healy ................ B60L 15/2018

* cited by examiner

ENERGY MANAGEMENT SYSTEM FOR A TOWED VEHICLE

RELATED APPLICATIONS

The present invention claims priority from Australian Provisional Patent Application no. 2017903872, filed 22 Sep. 2017, the entire contents of which are incorporated herein by reference.

FIELD OF INVENTION

The present invention relates generally to towed vehicles, including trailers and recreational vehicles such as caravans, camper trailers and the like. In particular, the present invention relates generally to a system and method for harvesting, storing and using energy generated during motion of the towed vehicle for a variety of useful purposes.

BACKGROUND OF THE INVENTION

Recreational vehicles (RVs), such as caravans and camper trailers, are a popular form of portable accommodation used by many as an economic and enjoyable way in which to experience the outdoors in an independent and comfortable manner. They are typically hitched behind a passenger vehicle and towed to a destination where they are unhitched from the towing vehicle and set up as an accommodation site in accordance with the user's personal preferences.

RVs are largely passive systems that are towed behind a vehicle and rely upon the towing vehicle to supply energy to move the RV. Due to the weight of the RV, the towing vehicle requires a significant amount of towing energy to tow an RV, especially in hilly, sandy or mountainous regions and from a stationary position.

To address stability issues associated with towing an RV in a downhill situation, it has been known to fit an RV with frictional brakes to assist the towing vehicle in reducing speed and maintaining control of the heavier RV. Such systems generally function by converting the kinetic energy associated with the wheels of the RV into heat, which can be expelled into the environment to slow down the vehicle. Whilst such systems have proven effective in providing more control to the driver of the towing vehicle in such downhill situations, it is subject to wear and over time requires significant maintenance to maintain a consistent co-efficient of friction.

In recent times, due to an increased desire to conserve energy within a system, Kinetic Energy Recovery Systems (KERS) have been proposed to recover at least some of the discarded braking energy. Such KERS are used on many hybrid drive systems used in cars and trucks that seek to convert the kinetic energy present in the wheels of the vehicle into a mechanical flywheel or electrical storage system for re-use. This electrical energy can be converted to chemical energy and stored within a battery, supercapacitor or similar chemical power source where it can be called upon at a later time to assist in controlled braking and other similar systems.

In towing situations, especially in situations regarding RVs, there are a number of ways in which reclaimed or recovered energy can be used. As most RVs comprise a separate energy storage system for supplying power to operate the electrical features of the RV when used as an accommodation option, namely the fridge, lights etc, the ability to store and share recovered power offers many advantages outside or mere driving assistance. These can include powering lights, operating refrigerators, and a variety of other areas where power grid connection is generally required.

In driving situations, the recovered kinetic energy can be used to assist drivers in climbing hills, reducing the amount of energy required to move from a stationary position, as well as improved overtaking capability. This is because the recovered energy obtained during the braking process of the RV vehicle can be directly applied to the wheels of the RV vehicle to power them to assist in supplying the motive force. By cleverly employing such a system there are considerable benefits to be had in terms of fuel efficiency as well as improved control of the vehicle.

Thus, there is a need to provide a system and method of operation of a towed RV that enables energy to be harvested, stored and used to better benefit the RV user.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the present invention there is provided an energy management system for a towed vehicle comprising;
- an energy harvesting system for harvesting electrical energy from the energy of the towed vehicle;
- an energy storage system for storing said harvested electrical energy; and
- a computer controller for controlling the release of said stored electrical energy to one or more components of the towed vehicle for operating the towed vehicle.

In one embodiment, the energy harvesting system comprises one or more electric motors engagingly mounted with respect to one or more wheels of the towed vehicle. The energy harvesting system may be controllable by the computer controller to engage with the one or more wheels during deceleration of the towed vehicle so as to harvest electrical energy from the energy lost from the wheels during deceleration of the towed vehicle.

The one or more components of the towed vehicle may comprise the one or more electric motors for driving one or more wheels of the towed vehicle.

The computer controller may control the supply of stored electrical energy to the one or more electric motors to facilitate driving of the towed vehicle in response to one or more sensed conditions. The one or more sensed conditions may comprise movement of the towed vehicle from a stationary position. The one or more sensed conditions may comprise uphill movement of the towed vehicle. The one or more sensed conditions may comprise the towed vehicle overtaking another vehicle. The one or more sensed conditions may comprise movement of the towed vehicle against a head wind as detected by one or more aerodynamic load sensors mounted with respect to the towed vehicle.

The energy harvesting system may comprise an energy recovery system for converting energy from the wheels of the towed vehicle into electrical energy.

The one or more components may comprise an autonomous drive system for driving an unhitched towed vehicle to a desired parking position. The computer controller controls the supply of stored electrical energy to the one or more electric motors to facilitate autonomous driving of the unhitched towed vehicle under remote control.

The computer controller may be connectable to a remote network and is capable of analysing a planned route for the towed vehicle to determine that the energy harvesting system harvests enough energy from the towed vehicle to ensure that maximum harvested electrical energy is available in the energy storage system at completion of the route.

Accordingly, in another aspect of the present invention there is provided a method of operating an energy management system for a towed vehicle as defined by any one of claims 1-13, comprising the steps of;
- receiving details of a route to be travelled by the towed vehicle;
- downloading a terrain map of the route to determine ascents and descents along the route;
- controlling the energy harvesting system such that the energy storage system has sufficient energy to apply driving motion to the wheels of the towed vehicle during at least some of the ascents, and that the energy harvesting system harvests at least some energy during the descents such that the energy storage system is substantially at capacity at the conclusion of the route.

BRIEF DESCRIPTION OF THE DRAWINGS

The invention may be better understood from the following non-limiting description of preferred embodiments, in which.

DETAILED DESCRIPTION

The present invention will be described below in relation to a caravan of the type that is to be towed by a vehicle. However, it will be appreciated that the present invention could be equally employed in any variety of recreational vehicles and camper trailers that are to be towed by a vehicle and still fall within the spirit of the present invention.

Figure 1:
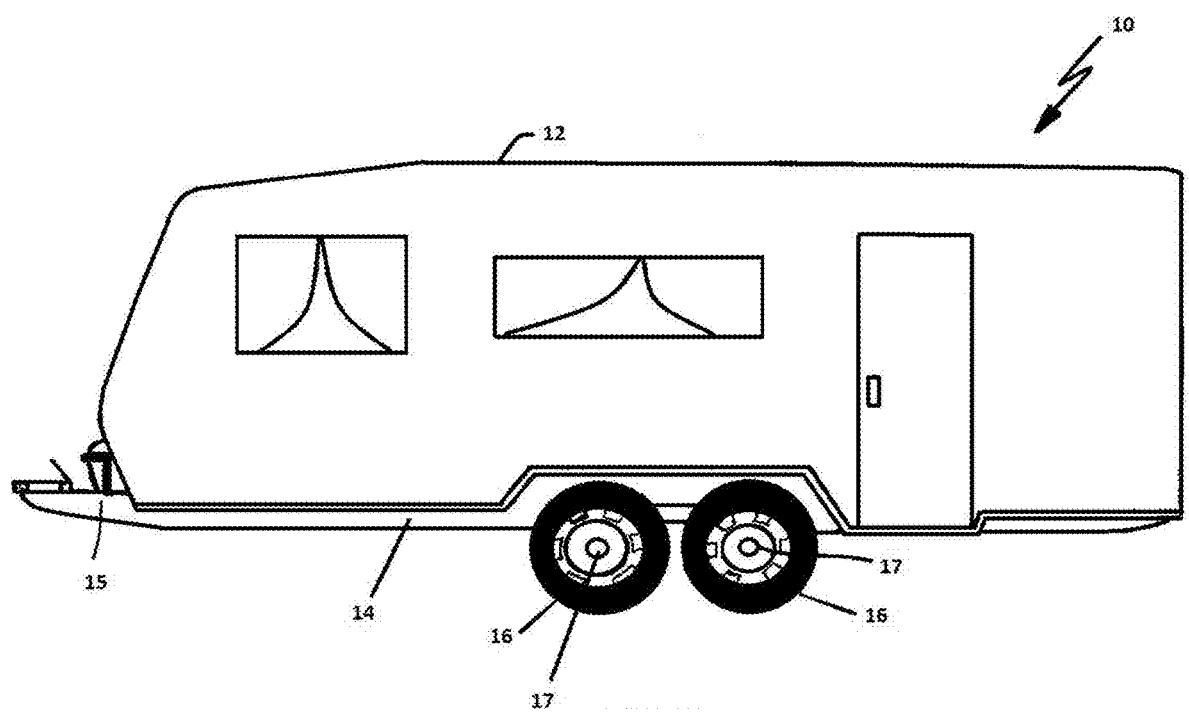
FIG. 1 is a side view of caravan suitable for use with the present invention.

Referring to FIG. 1, a caravan 10 is depicted for application of the present invention in accordance with an embodiment thereof. The caravan 10 is of a conventional type and comprises a chassis 14 that supports a body 12. The body 12 forms an enclosure over the top of the chassis 14 and is configured to function as a mobile accommodation space, as is well known in the art. A hitch 15 is attached to a front end of the chassis 14. The hitch 15 attaches to a tow ball or the like of a towing vehicle (not shown) and may be configured in a variety of different ways so as to provide secure attachment to the towing vehicle as well as the transfer of control signals from the towing vehicle to the caravan 10 so as to operate the turning signals of the caravan 10 and various other functions as would be well understood by those skilled in the art.

The chassis 14 is supported above a ground surface by way of a pair of wheels 16 mounted upon a pair of axles 17 that extend across the chassis 14. Each of the wheels 16 are mounted on opposing ends of the axles 17 with the axles 17 generally centrally located with respect to the caravan 10. Each of the wheels 16 are free to rotate on the axle under the towing force supplied by the towing vehicle. Whilst two sets of wheels 16 on a pair of axles 17 are depicted in the embodiment of FIG. 1, it will be appreciated that in some situations, only a single set of wheels 16 on a single axle 17 may be employed.

It will be appreciated that the caravan 10 will be configured such that the caravan can be connectable to a mains power supply to supply power to operate the various features of the caravan 10 when used as accommodation. The caravan 10 will also have the ability to connect to solar, wind, petrol/diesel and fuel cell power generators to supply power to the caravan where mains power supply is not readily available.

Figure 2:
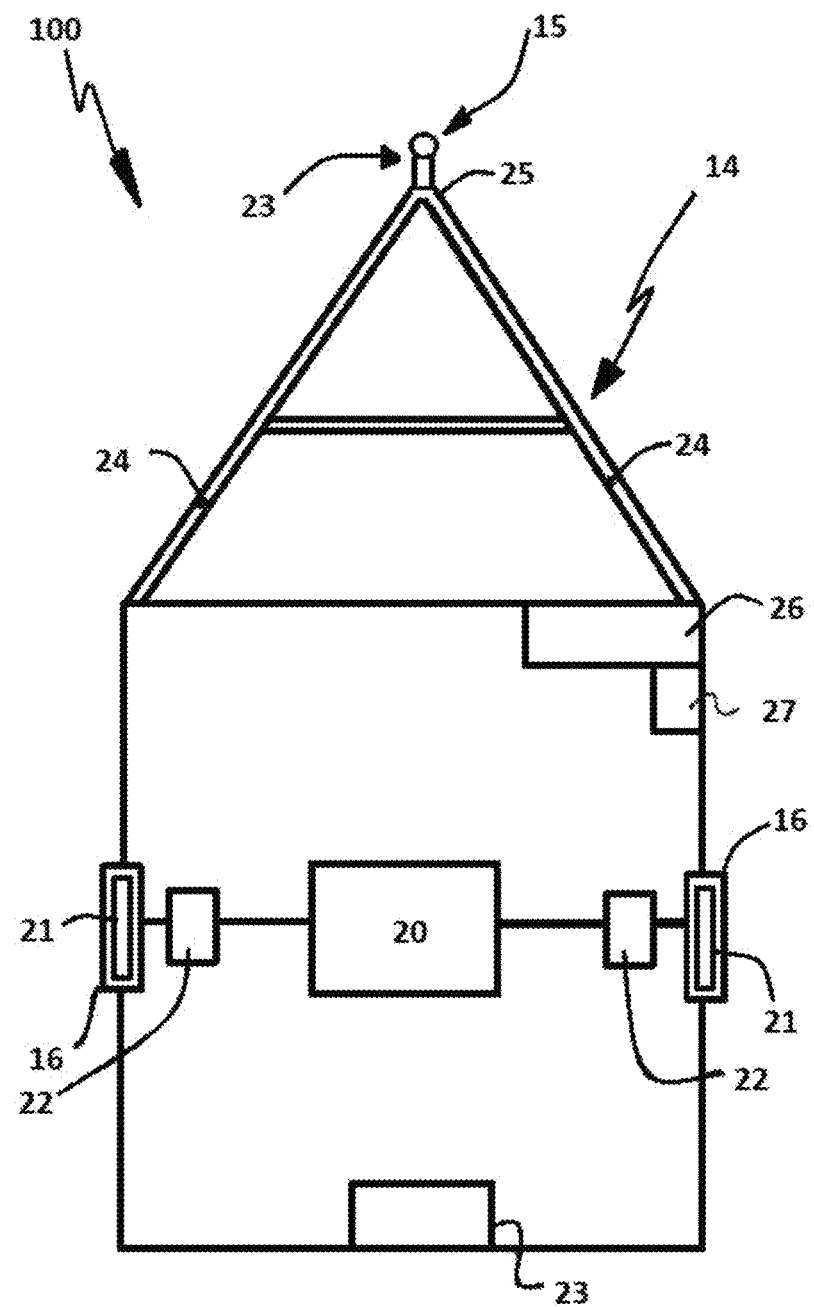
FIG. 2 depicts an embodiment of the energy management system of the present system as mounted to a caravan.

Referring to FIG. 2, a chassis 14 of a caravan 10 employing the system 100 of the present invention is shown. The chassis 14 has an energy storage system 20 in the form of a battery or bank of batteries controlled by a battery controller. It will be appreciated that the energy storage system may also comprise capacitors or fuel cells as they become more acceptable in such vehicle applications. The energy storage system 20 is centrally mounted on the chassis so as to be ensure centre of gravity position over the axel 17 of the caravan. The energy storage system is also able to receive charge from the caravan 10 when idle such that it can be recharged when connected to mains power supply when the caravan is in use as an accommodation source.

Each wheel 16 has an electric motor 21 mounted within a hub thereof which is in operable connection with the energy storage system so as to drive the wheel 16 as required. The electric motor 21 may be in operable connection with the wheel 16 by way of a toothed gear or similar such that I can be simply engaged/disengaged by a controller, as required. The electric motor may alternatively be mounted on the chassis 14 of the caravan 10 which is operably connected to the wheel by way of a conventional differential and CV joint. A Kinetic Energy Recovery System 22 (KERS) is mounted adjacent each wheel 16 so as to convert the kinetic energy of the wheels 16 as they slow during braking into electrical energy which is then stored in the energy storage system 20. The KERS is able to control the electrical motor 21 such that it can be used as a generator during breaking and other situations to recover energy from the wheels 16 as well as a motor to drive the wheels as required. The energy storage system may comprise supercapacitors or super batteries capable of charging and discharging large amounts of energy in short periods of time. In some embodiments, the energy storage system may include an electric or mechanically driven flywheel for the storage and later usage of kinetic energy recovered from the wheels 16.

Motion sensors 23, such as gyroscopes, accelerometers, vision sensors such as cameras, infrared sensors, radar sensors are mounted on a front and rear surface of the chassis 14 as well as in the drawbars of the chassis, as shown. The motion sensors detect acceleration/deceleration of the caravan 10 as well as lateral and horizontal movement of the caravan 10 with respect to the towing vehicle. Such motion sensors 23 also make it possible to measure yaw of the caravan 10, for example, if a vehicle is positioned on a sharp incline in a sideways position, one wheel will experience a bulk of the weight of the caravan whilst the other wheel will have little to no weight passing therethrough. Thus, by detecting this situation, the controller can reduce the power applied to the wheel with less weight and deliver most power to the wheel supporting the most weight to control motion of the caravan. The manner in which the motion sensors 23 can be used to control the system in a manner as will be discussed in more detail below.

Load sensors 24 are mounted on each of the drawbars, or between each of the drawbars, to determine deflection of the drawbar under load, in relation to static and dynamic load conditions. The load sensors 24 are able to monitor the drawbar arms to determine the amount of stress/strain they are experiencing due to the push/pull of the caravan as well as situations where excessive weight is being carried by the caravan, or there are shifts/changes in the weight distribution during towing of the caravan.

An angular sensor 25 is mounted to the front end of the chassis to provide continual information on the relationship of the caravan 10 to the towing vehicle. This information will be used by the computer controller of the present system to ensure that the caravan 10 is located in an appropriate position with respect to the towing vehicle. The manner in which the load sensors 24 function is described in detail in the present Applicant's co-pending Australian provisional patent application no. 2017903870, the entire contents of which are incorporated herein by reference. In this regard, compression sensors described in this co-pending application, namely compression sensors mounted on the springs of the suspension system, can also be used to further control the power delivered to the wheels of the caravan by the electric motors. For example, if the compression sensors do not detect any load it is indicative of the wheel being in the air and as such power is not delivered to the wheels in such a condition.

The system will also include an aerodynamic sensor that is capable of measuring aerodynamic load on the caravan 10. The aerodynamic sensor comprises one or more pilot tube sensors mounted on the surface of the caravan 10 that is capable of measuring wind resistance of the caravan in motion. The computer controller is then able to use this information to provide real time bias correction based on surface winds. This would include the computer controller providing driving motion to the wheels of the caravan in the presence of a high head wind and to slow the wheels in the presence of a tail wind. Further driving assistance could also be provided in the presence of cross winds to ensure that caravan stability is maintained.

A computer controller 26 is provided, typically within the body of the caravan to control the system and receive and analyse the data being generated and transmitted by the various system components. The computer controller 26 may be a standard computer accessible remotely or directly by way of a user interface to interrogate and control the system. The computer controller 26 may be configured with a platform software for journey planning and energy management based on signals received from the relevant controllers. A GNSS receiver or similar positioning system software and hardware is provided with the computer controller to provide up to date position information through the interrogation of all available Global Navigation Satellite Systems.

Figure 3:
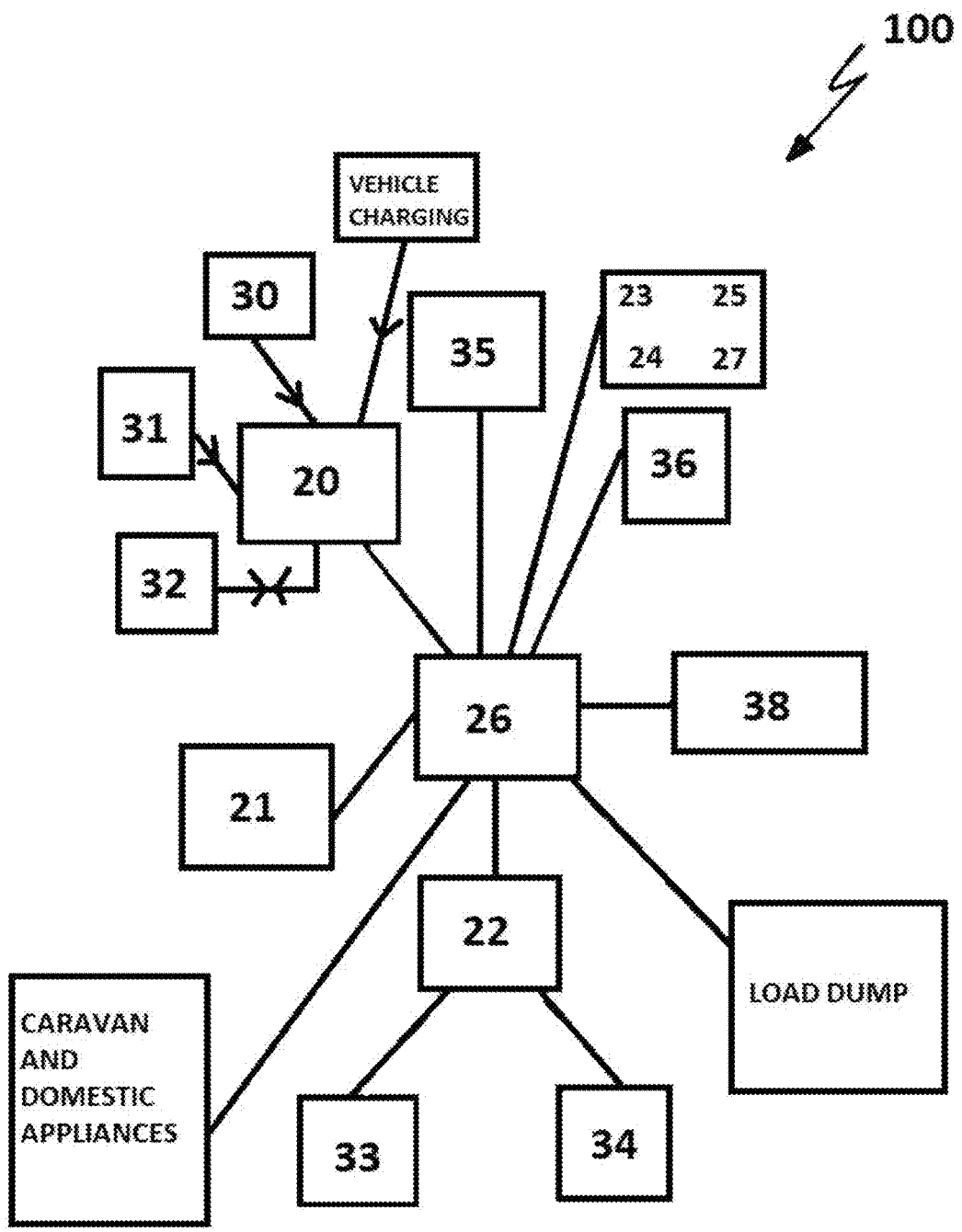
FIG. 3 is a system drawing of the present invention depicting the relationship of each of the components of the energy management system.

Referring to FIG. 3, the system 100 is depicted. The computer controller 26 functions as a central unit to control the various features of the system 100 in the manner as will be described below. The computer controller 26 comprises a CPU and appropriate memory to store software to control the overall system.

The computer controller 26 is able to regularly interrogate the controller of the energy storage system 20 to determine the amount of charge present therein at any time. If the state of charge in the energy storage system 20 is below a predetermined threshold, the computer controller 26 may direct the controller of the energy storage system 20 to access external charging sources 30, 21 and 32. These include a solar energy supply system 30 that may be associated with the caravan, a generator power source 31 or a mains power supply 32, depending on the availability of such sources to the system at the time of detection.

The computer controller 26 is able to provide control instructions to drive the electric motors 21 inside each of the wheels 16 as required. This may be in response to data provided by the various sensors 23, 24, 25 and 27 which indicate whether the caravan 10 is in a decelerating mode or starting from a stationary position and requiring motive assistance. The data supplied from the various sensors may also be used by the computer controller 26 to control the state of the electric motors 21. This can ensure that the wheels 16 are only driven by the motors 21 when it is safe and effective to do so, namely when the caravan is correctly positioned behind the towing vehicle as established by the angular sensor 25 and when the wheels of the caravan are detected to be engaged with the ground surface. Further, the use of multiple sensors, such as ultrasonic/camera or optical sensors to "hands off" measure the rear of the vehicle with respect to the caravan, such as when going around a sharp roundabout, the system will function so as to only supply very low motive power to only one of the wheels. This may be because the sensors mounted on the front of the caravan are indicating that the relationship of the position of the caravan with respect to the vehicle indicates that the situation is close to becoming a jack-knife situation, or could easily cause one. For this reason, such a sensor arrangement provides horizontal and angular detection and is critical. Such sensors are also useful in enabling full ABS of motor driven wheels.

The computer controller 26 communicates with the KERS controller to ensure that any kinetic energy associated with deceleration of the wheels 16 is captured by the motor and stored in the energy storage system, either through the use of super capacitors 33 or electrical/mechanical driven flywheels 34.

The system 100 of the present invention is able to utilise energy stored in the energy storage system to facilitate self-driving of the caravan with the use of a connected or remote-control device 35. The computer controller 26 may be put in the self-driving mode when the caravan 10 has been parked and a jockey wheel or the like is mounted to the hitch. In such a mode, the stored energy present in the energy storage system 20 is supplied to the electric motors 21 to drive the wheels of the caravan 10. Camera vision systems can be used by the computer controller to autonomously drive the caravan to a designated camping site by way of defined optical attributes and proximity vision systems. Other sensors in the caravan can be combined to supply information to the controller 26 to autonomously drive the caravan to the designated parking bay location. Similarly, the use of sensors in the caravan can be combined with other installed ground surface mounted sensors, ensuring exact parking location is achieved. Alternatively, the caravan 10 may be manually controlled by a remote control device controlling the motor for each wheel of the caravan.

The system 100 can interface with the towing vehicle by way of a dedicated interface system 36. The interface system 36 makes it possible for information obtained from the caravan sensors about the state of the caravan and/or driving conditions are readily transferred to the driver of the towing vehicle to provide an updated view of the state of the caravan being towed and the safety of the towing procedure.

The computer controller also has the ability to enable a journey to be planned and mapped by way of a software interface 38. This interface may comprise a downloadable software interface that is capable of receiving a travel itinerary and plotting the journey in terms of elevation such that the system elements can be employed to provide assistive drive up ascents to reduce fuel consumption and minimise traffic congestion due to a slow ascent, whilst employing the KERS to maximise energy creation. Whilst not shown, the system of the presently described invention may comprise a load dump in the form of a resistor bank/induction heat dump/other significant load dump. Such a load dump enables energy to be dissipated if the battery is approaching 100% full, such as around 92% full. In such situations, a load dump can "blow off" kilowatts of energy as heat. In this regard, the friction brakes of the vehicle can be employed to dissipate energy and the electric motor(s) can function as an effective brake if the battery is nearly full/or full.

Figure 4:
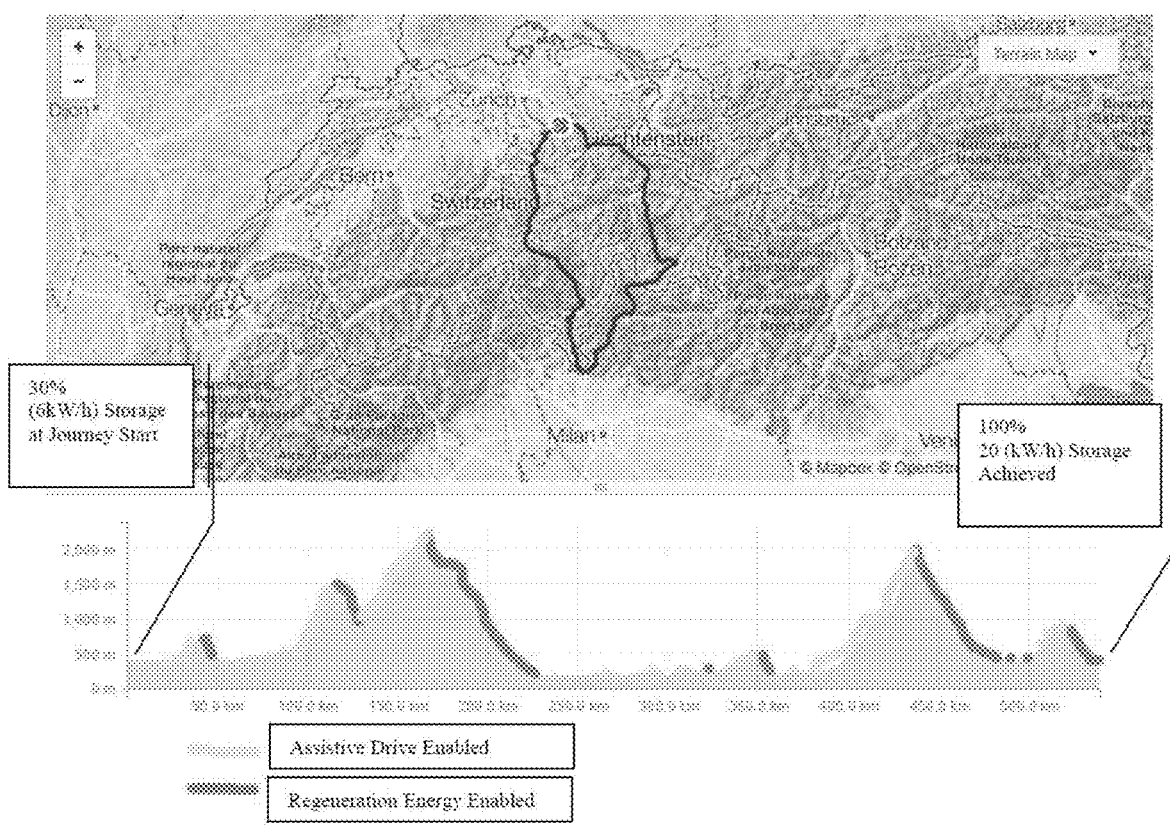
FIG. 4 depicts a trip planner embodiment of the present invention for managing energy harvesting and use during a trip.

An example of how this may be achieved is shown in FIG. 4. In this arrangement, the computer controller 26 plots the proposed journey against a terrain map and determines the ascents and descents along the route. The computer controller is then able to interrogate the energy storage system 20 to determine the starting storage level of power. By determining how much power is stored at the commencement of the journey, the computer controller 26 is able to determine when to use assistive drive to activate the electric motors to provide drive assistance and when to activate the KERS to activate the electric motors to harness energy such that at the end of the journey the energy storage system 20 is at 100% storage capacity to initiate the other modes of use of the system 100 that require power, such as lighting, electric appliances and the like. It will be appreciated that, in many instances, prior to undertaking a trip the caravan can be building up power for several days via solar sources to ensure that the caravan never commences a journey without the energy storage system being at 100% capacity. Such a system also enables any excess energy generated by the system to be sold back into the grid so that the user is able to collect a tariff. With such a system, even if the driver deviates from the initial programmed path, the computer controller via the dedicated software is able to calculate a re-route journey and create a new energy management regime based on the new path to ensure that the energy storage systems are as close as possible to 100% upon reaching the destination.

It will be appreciated that the system and method of the present invention provides a simple and effective means for managing energy storage to provide a variety of different functions to assist in towing and using the caravan. The system is able to monitor stored energy capacity and system requirements and provide a multiple of services that ensure that maximum energy is stored for operating the variety of features of the system.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. An energy management system for a towed vehicle comprising;
    an energy harvesting system for harvesting electrical energy from the energy of the towed vehicle, the energy harvesting system comprising an electric motor engagingly mounted with respect to a wheel of the towed vehicle;
    an energy storage system for storing said harvested electrical energy; and
    a computer controller for controlling the release of said stored electrical energy to a component of the towed vehicle for operating the towed vehicle, the computer controller receiving and analyzing a planned route for the towed vehicle for determining at least a first portion of the planned route where the energy harvesting system is able to harvest electrical energy and at least a second portion of the planned route where the harvested electrical energy is able to be released to the component of the towed vehicle,
    wherein the computer controller interrogates the energy storage system at commencement of the planned route for determining a starting energy storage level of the energy storage system and controls the harvesting of electrical energy by engaging the electric motor with the wheel of the towed vehicle during deceleration of the towed vehicle for harvesting the electrical energy from energy lost from the wheel of the towed vehicle during deceleration and controls the release of the electrical energy for ensuring that the energy storage system is at maximum capacity at completion of the planned route.

2. The energy management system according to claim 1, wherein the component of the towed vehicle comprises the electric motor for driving wheels of the towed vehicle.

3. The energy management system according to claim 2, wherein the computer controller controls the supply of stored electrical energy to the electric motor to facilitate driving the towed vehicle in response to a sensed condition.

4. The energy management system according to claim 3, wherein the sensed condition comprises movement of the towed vehicle from a stationary position.

5. The energy management system according to claim 3, wherein the sensed condition comprises uphill movement of the towed vehicle.

6. The energy management system according to claim 3, wherein the sensed condition comprises the towed vehicle overtaking another vehicle.

7. The energy management system according to claim 3, wherein the sensed condition comprises movement of the towed vehicle against a head wind as detected by an aerodynamic load sensor mounted with respect to the towed vehicle.

8. The energy management system according to claim 1, wherein the energy harvesting system comprises an energy recovery system for converting energy from wheels of the towed vehicle into electrical energy.

9. The energy management system according to claim 1, wherein the component of the towed vehicle comprises an autonomous drive system for driving the towed vehicle to a desired parking position when the towed vehicle is unhitched.

10. The energy management system according to claim 8, wherein the computer controller controls the supply of stored electrical energy to the electric motor to facilitate autonomous driving of the towed vehicle under remote control when the towed vehicle is unhitched.

11. An energy management system for a towed vehicle comprising;
- an energy harvesting system for harvesting electrical energy from the energy of the towed vehicle;
- an energy storage system for storing said harvested electrical energy;
- an electric motor engagingly mounted with respect to wheels of the towed vehicle; and,
- a computer controller for controlling the release of said stored electrical energy to a component of the towed vehicle for operating the towed vehicle, the computer controller receiving and analyzing a planned route for the towed vehicle for determining at least a first portion of the planned route where the energy harvesting system is able to harvest electrical energy and at least a second portion of the planned route where the harvested electrical energy is able to be released to the component of the towed vehicle, the component of the towed vehicle comprises comprising the electric motor for driving the wheels of the towed vehicle,
- wherein the computer controller interrogates the energy storage system at commencement of the planned route for determining a starting energy storage level of the energy storage system and controls the harvesting and releasing of electrical energy for ensuring that the energy storage system is at maximum capacity at completion of the planned route.

12. The energy management system according to claim 11, wherein the computer controller controls the supply of stored electrical energy to the electric motor to facilitate driving the towed vehicle in response to a sensed condition.

13. The energy management system according to claim 12, wherein the sensed condition comprises movement of the towed vehicle from a stationary position.

14. The energy management system according to claim 12, wherein the sensed condition comprises uphill movement of the towed vehicle.

15. The energy management system according to claim 12, wherein the sensed condition comprises the towed vehicle overtaking another vehicle.

16. The energy management system according to claim 12, wherein the sensed condition comprises movement of the towed vehicle against a head wind as detected by an aerodynamic load sensor mounted with respect to the towed vehicle.

17. The energy management system according to claim 11, wherein the energy harvesting system comprises an energy recovery system for converting energy from the wheels of the towed vehicle into electrical energy.

18. An energy management system for a towed vehicle comprising;
- an energy harvesting system for harvesting electrical energy from the energy of the towed vehicle;
- an energy storage system for storing said harvested electrical energy;
- a computer controller for controlling the release of said stored electrical energy to a component of the towed vehicle for operating the towed vehicle, the computer controller receiving and analyzing a planned route for the towed vehicle for determining at least a first portion of the planned route where the energy harvesting system is able to harvest electrical energy and at least a second portion of the planned route where the harvested electrical energy is able to be released to the component of the towed vehicle, the component of the towed vehicle comprises an autonomous drive system for driving the towed vehicle to a desired parking position when the towed vehicle is unhitched,
- wherein the computer controller interrogates the energy storage system at commencement of the planned route for determining a starting energy storage level of the energy storage system and controls the harvesting and releasing of electrical energy for ensuring that the energy storage system is at maximum capacity at completion of the planned route.

19. The energy management system according to claim 18, wherein the computer controller controls the supply of stored electrical energy to the electric motor to facilitate autonomous driving of the towed vehicle under remote control when the towed vehicle is unhitched.

* * * * *